Apr. 17, 1923.
J. A. HOUSEMAN
HEDGE TRIMMER
Filed June 11, 1921
1,452,462
2 Sheets-Sheet 1
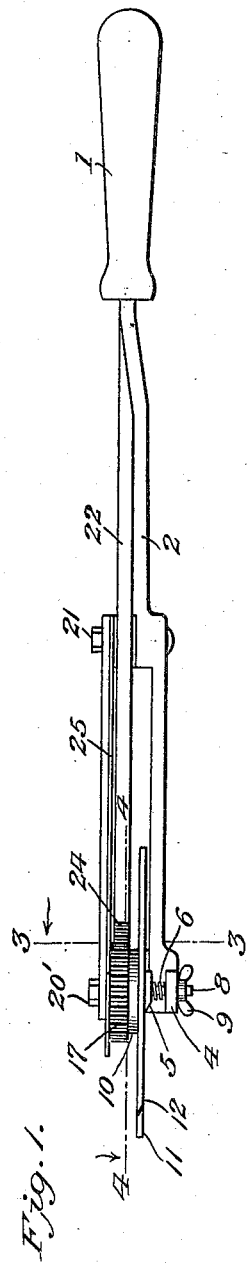
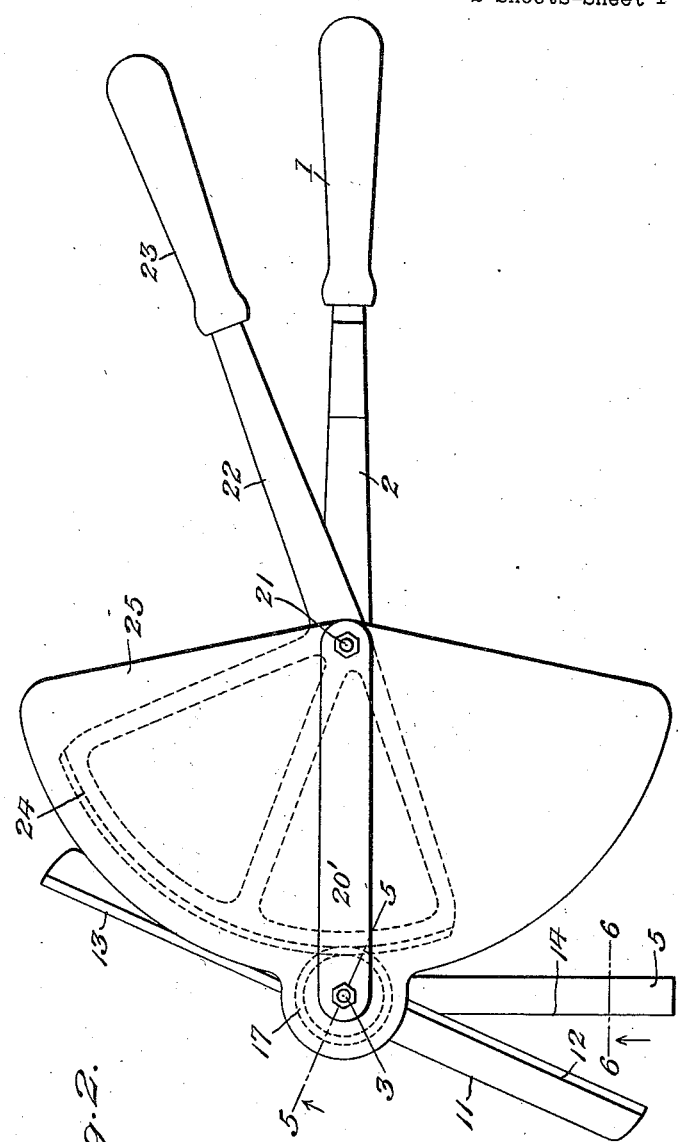
J. A. Houseman INVENTOR
BY Victor J. Evans
ATTORNEY Apr. 17, 1923.
J. A. HOUSEMAN
1,452,462
HEDGE TRIMMER
Filed June 11, 1921
2 Sheets-Sheet 2
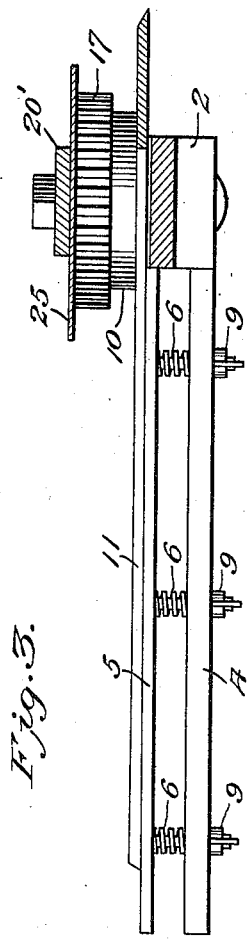
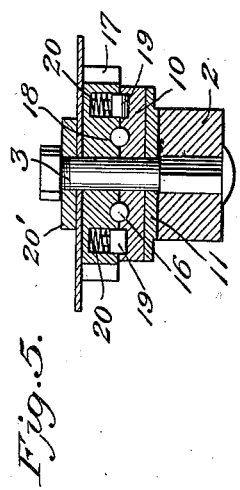
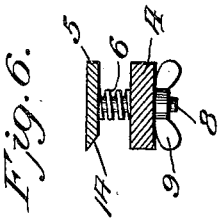
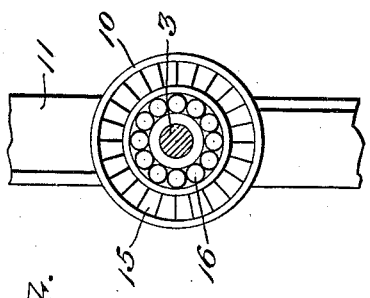
J. A. Houseman INVENTOR
BY Victor J. Evans
ATTORNEY Patented Apr. 17, 1923.

1,452,462

UNITED STATES PATENT OFFICE.

JAMES A. HOUSEMAN, OF YORK, PENNSYLVANIA.

HEDGE TRIMMER.

Application filed June 11, 1921. Serial No. 476,868.

*To all whom it may concern:*

Be it known that I, JAMES A. HOUSEMAN, a citizen of the United States, residing at York, in the county of York and State of Pennsylvania, have invented new and useful Improvements in Hedge Trimmers, of which the following is a specification.

My present invention has reference to an improved hedge trimmer.

My primary object is to produce a hedge trimmer that includes a stationary blade and a coacting revoluble blade, both supported from a suitable handle, the revoluble blade receiving motion from means actuated by a second handle which is pivotally associated with the first mentioned handle, said means including mechanism whereby the oscillation of the last mentioned handle imparts a continuous rotary movement to the rotary blade.

A further object is to produce a hedge trimmer in which the oscillatory movement of handle members imparts a rotary motion to a double edged blade to cause the same to be brought to wiping position with respect to a stationary blade and wherein said stationary blade is adjustable with respect to the movable blade.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of the improvement, the shield being partly broken away.

Figure 2 is a top plan view thereof.

Figure 3 is a sectional view on the line 3—3 of Figure 1.

Figure 4 is a sectional view on the line 4—4 of Figure 1.

Figure 5 is a sectional view on the line 5—5 of Figure 2, looking in the direction of the arrows and taken on an enlarged scale.

Figure 6 is a view on the line 6—6 of Figure 2, looking in the direction of the arrows, and also taken upon an enlarged scale.

Referring now to the drawings in detail, the numeral 1 designates a handle from which extends a flat shank 2. The shank, at its outer end, carries a laterally extended shaft 3. On the outer end of this shaft there is rigidly secured one end of a plate 4, said plate being arranged at a right angle with respect to the shank 2. On the inner face of the plate 4 there is a cutter blade 5. Between the blade 5 and the plate 4 there are springs 6 which have a tendency to force the blade away from the plate. Secured to the inner face of the blade 5, and passing through openings in the plate 4 are threaded members 8 that are engaged by winged nuts 9 which contact with the outer face of the plate 4. By adjusting the nuts the blade may be retained at desired relations with respect to the plate 4.

Mounted for rotary movement on the shaft 3 is the hub 10 which is centrally secured on one side of a blade 11. The blade thus is projected from both sides of the hub and has its diagonally opposed edges sharpened to provide cutting edges 12 and 13 respectively. These cutting edges are designed to cooperate with the outer cutting edge 14 on the blade 5. The hub 10 is in the nature of a disk, having its inner face from its periphery formed with ratchet teeth 15, and inward of the ratchet teeth with a raceway for anti-frictional balls 16. Also free mounted on the shaft 3 is a pinion 17 that has a hub portion provided with a raceway 18 that receives the anti-frictional balls 16. The outer face of the pinion 17, or the face thereof opposite the hub of the double edged blade 11, has pockets therein in which are received dogs 19 that are influenced outwardly by springs 20 to engage with the shoulders of the ratchet teeth 15 on the hub 10. Suitable means, broadly indicated by the numeral 20 are provided for holding the pinion against the hub of the blade 11 and for holding both the blade and the pinion 17 from longitudinal movement on the shaft 3.

Pivoted, as at 21, to the shank 2, is a second shank 22 that has its outer end provided with a handle 23 and its upper end widened and formed with a segmental rack 24. The rack 24 is in mesh with the teeth of the pinion 17. By providing the dog and ratchet engagement between the pinion 17 and the hub of the double edged blade 11, an oscillatory movement of the handle 23 with respect to the handle 1 will impart a continuous rotary movement to the blade 11 whereby a quick and effective cutting action is effected. By providing the means for adjusting the blade 5 with respect to the blade 11, a proper cutting action between these blades may be at all times properly provided for, and in addition to this, the wiping of the rotary blade against the stationary blade tends to sharpen both of the blades.

Over the pinion and the toothed segment of the second mentioned shank there is a protective shield 25, whereby the cuttings from plants will be prevented from engagement between the teeth of either the pinion or segment.

It is thought that the foregoing description, when taken in connection with the drawings will fully set forth the construction, operation and advantages of the improvement to those skilled in the art to which this invention appertains, but it is to be understood that the improvement is not to be restricted to the precise details of construction shown and described, and such departures may be made therefrom as fall within the scope of what is claimed.

Having described the invention, I claim:—

1. In a hedge trimmer, a handle having a shank extension provided with a shaft, a stationary blade secured on the shaft, a second blade centrally mounted for rotary movement on the shaft, a pinion freely mounted on the shaft, having means coengaging with means on the rotary blade whereby to impart motion to the blade, when the pinion is revolved, a second shank pivoted to the first mentioned shank, said second shank having its outer end provided with a handle and its inner end with a toothed segment to engage with the pinion, and said means between the pinion and rotary blade permitting a rotary movement being imparted to said blade when the pinion is influenced by the segment and the oscillatory movement of the second mentioned shank.

2. In a hedge trimmer, a handle having a shank extension, a shaft thereon, a plate secured to and extending from the shaft at right angles with respect to the shank, a blade disposed opposite the plate, spring means forcing the blade away from the plate, means between the plate and blade adjusting the spring means, and a blade having its diagonally opposed edges sharpened and centrally provided with a hub which is mounted on the shaft, said hub having a ratchet face, a pinion freely mounted on the shaft, spring influenced dogs carried by the pinion engaging the ratchet teeth of the hub, anti-frictional means between the pinion and hub, a second shank pivotally connected to the first mentioned shank having its outer end provided with a handle and its inner end widened and formed with a rack surface to engage with the pinion, all as and for the purpose set forth.

In testimony whereof I affix my signature.

JAMES A. HOUSEMAN.